United States Patent
Lever et al.

(10) Patent No.: US 11,002,385 B2
(45) Date of Patent: May 11, 2021

(54) SURROUNDING MEMBER FOR A PIPE

(71) Applicant: Snug Solutions Ltd, Harpenden (GB)

(72) Inventors: Alexander Jonathan Lever, Harpenden (GB); Christopher Robert Burdett, Harpenden (GB)

(73) Assignee: Snug Solutions Ltd, St. Albans (GB)

( * ) Notice: Subject to any disclaimer, the term of this patent is extended or adjusted under 35 U.S.C. 154(b) by 24 days.

(21) Appl. No.: 15/768,314

(22) PCT Filed: Oct. 13, 2016

(86) PCT No.: PCT/GB2016/000184
§ 371 (c)(1),
(2) Date: Apr. 13, 2018

(87) PCT Pub. No.: WO2017/064450
PCT Pub. Date: Apr. 20, 2017

(65) Prior Publication Data
US 2018/0299034 A1    Oct. 18, 2018

(30) Foreign Application Priority Data

Oct. 13, 2015 (GB) ..................... 1518086

(51) Int. Cl.
*F16L 5/10* (2006.01)
*H02G 3/22* (2006.01)

(52) U.S. Cl.
CPC . *F16L 5/10* (2013.01); *H02G 3/22* (2013.01)

(58) Field of Classification Search
CPC ........ F16L 5/00; F16L 5/02; F16L 5/10; F16J 15/02; F16J 15/04; H02G 3/22
See application file for complete search history.

(56) References Cited

U.S. PATENT DOCUMENTS

| | | | |
|---|---|---|---|
| 4,385,777 A | 5/1983 | Logsdon | |
| 4,623,170 A * | 11/1986 | Cornwall | E04G 15/061 249/177 |
| 4,699,177 A | 10/1987 | Thomas | |
| 7,815,225 B2 * | 10/2010 | Jones | F16L 37/0925 285/339 |
| 8,490,353 B2 * | 7/2013 | Beele | F16L 5/10 52/220.8 |
| 8,833,014 B2 * | 9/2014 | Beele | H02G 3/22 277/607 |

(Continued)

FOREIGN PATENT DOCUMENTS

| | | |
|---|---|---|
| CN | 204284673 U | 4/2015 |
| DE | 8535542.9 | 3/1986 |

(Continued)

OTHER PUBLICATIONS

Search Report of the UK Intellectual Property Office, in GB Patent Application No. 1518086.2, dated May 9, 2016, 5 pages.

(Continued)

*Primary Examiner* — Gilbert Y Lee
(74) *Attorney, Agent, or Firm* — Ellen M. Bierman; Lowe Graham Jones PLLC (57) ABSTRACT

A surrounding member for a pipe, the surrounding member having a rigid ring section and a flexible flange section. The ring section and the flange section have a cut therethrough to permit the member to be located around a pipe in-situ.

16 Claims, 9 Drawing Sheets

(56) References Cited

U.S. PATENT DOCUMENTS

| | | | |
|---|---|---|---|
| 9,528,636 B2* | 12/2016 | Beele | F16L 5/10 |
| 9,611,966 B2* | 4/2017 | Boelter | F16L 37/0925 |
| 9,951,869 B2* | 4/2018 | Lopez-Chaves | F16J 15/025 |
| 10,422,427 B2* | 9/2019 | Beele | F16J 15/02 |
| 2010/0059940 A1* | 3/2010 | Monteil | F16L 21/03 |
| | | | 277/314 |
| 2011/0041432 A1 | 2/2011 | Colwell et al. | |
| 2011/0088342 A1 | 4/2011 | Stahl, Sr. et al. | |
| 2013/0106060 A1* | 5/2013 | Beele | F16L 5/10 |
| | | | 277/314 |

FOREIGN PATENT DOCUMENTS

| | | |
|---|---|---|
| DE | 3839425 | 2/1990 |
| EP | 2169289 | 3/2010 |
| GB | 2150650 | 7/1985 |
| JP | 10185009 | 7/1998 |
| JP | 2009112138 | 5/2009 |
| JP | 2009250365 | 10/2009 |
| JP | 2012087513 | 5/2012 |
| KR | 1020110121289 | 11/2011 |
| KR | 2020140001571 | 3/2014 |

OTHER PUBLICATIONS

International Search Report and Written Opinion of the International Searching Authority in International Patent Application No. PCT/GB2016/000184, 19 pages.
"Open Snap-in Bushing (A Series)", cableorganizer.com, [online], Available from https://www.cableorganizer.com/richco/open-snap-in-bushing.htm [Accessed Apr. 13, 2018], 3 pages.

* cited by examiner

SURROUNDING MEMBER FOR A PIPE

CROSS-REFERENCE TO RELATED APPLICATIONS

This application is a U.S. national phase of International Patent Application No. PCT/GB2016/000184, filed Oct. 13, 2016; which claims priority from GB Patent Application No. 1518086.2, filed Oct. 13, 2015, which applications are incorporated herein by reference in their entireties.

FIELD OF INVENTION

The present invention relates to a surrounding member for a pipe. More especially the invention relates to a surrounding member for a pipe that fits around the pipe and provides an enclosure around the pipe and a wall into which the pipe extends.

BACKGROUND OF THE INVENTION

In many buildings where a pipe extends into a wall, for example, a toilet waste pipe, a gap is often left between the outer surface of the pipe and the wall aperture. Sometimes, this is filled by pointing or applying mortar, but poor finishing by a tradesman can result in the gap being left open. As well as being unsightly, moisture and air is able to pass through the gap which contributes to an overall reduction in the energy efficiency of the building. Pointing or applying mortar also incurs cost and labour.

STATEMENT OF INVENTION

A first aspect of the invention provides a surrounding member for a pipe, the surrounding member comprising a ring section and a flange section extending substantially perpendicularly from one side of the ring section, the surrounding member arranged to fit, in use, around a pipe at or near a location where the pipe extends into a wall, the ring section and the flange section having a cut to permit the member to be opened and located around a pipe in-situ.

Preferably the ring section is made from rigid material, such as a plastics material.

Preferably the flange section is made from a flexible material, such as a rubber material.

Preferably each edge of the ring section, either side of the cut, are connected by a clip insert. Preferably the insert clip is butterfly or bow-tie shaped.

Part or all of the flange section may be separable from the ring section. The flange section may be connected to the ring section by a region of weakness, such as a narrower wall than the rest of the section, permitting easy cutting or user tearing to remove the flange section.

According to a second aspect of the invention there is provided a surrounding member for a pipe, the surrounding member comprising a conical ring which fits, in use, around a pipe at a point where the pipe extends into a wall of a building, the ring having a first end of a first diameter and a second end of a larger diameter to that of the first, wherein the rims of first and second ends are lined with an adhesive foam material thereby to provide, during use, a seal between the sleeve and the pipe, and the end of the sleeve and the wall.

BRIEF DESCRIPTION OF THE DRAWINGS

Embodiments of the invention will now be described by way of example only, with reference to the accompanying figures in which.

DETAILED DESCRIPTION OF PREFERRED EMBODIMENTS

A first embodiment pipe surrounding member, and arrangements using such member, will now be described with reference to FIGS. 1 to 6.

Figure 1:
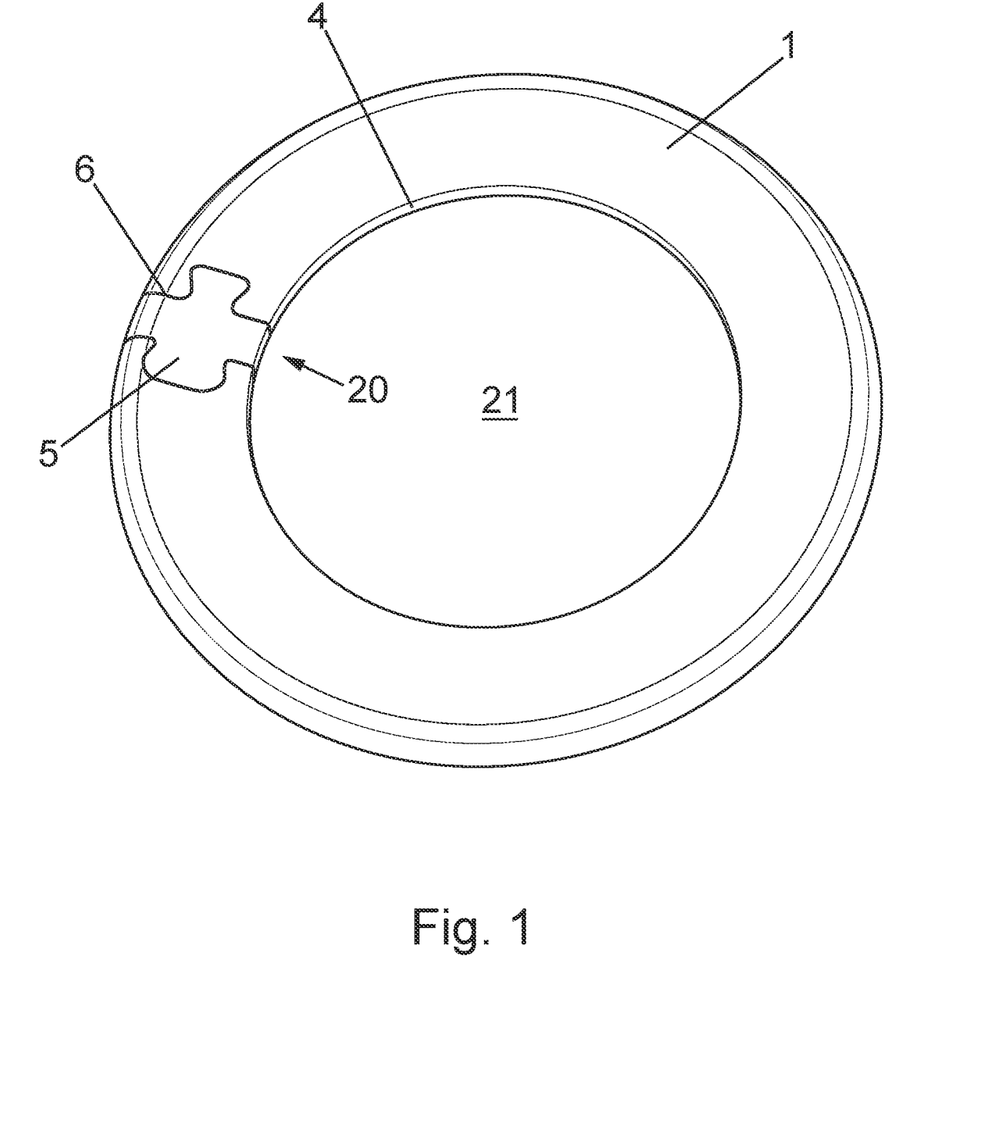
FIG. 1 is a top plan view of a first embodiment pipe surrounding member constructed in accordance with the invention.

The first embodiment pipe surrounding member is generally constructed of two parts, one being a flexible part and the other being a rigid part.

Figure 2:
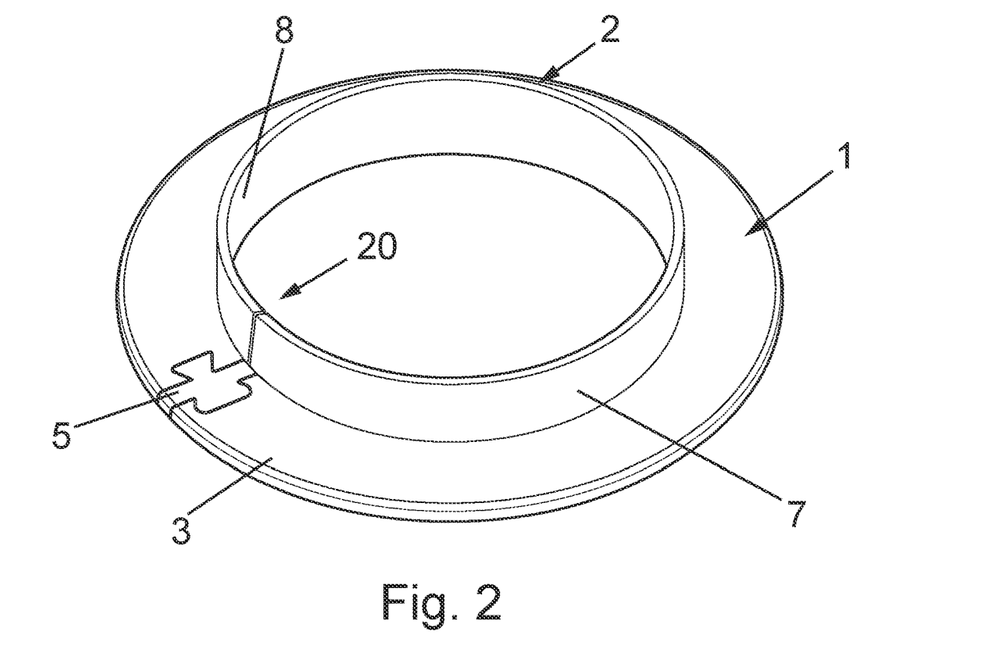
FIG. 2 is perspective view of the pipe surrounding member shown from one side.
Figure 3:
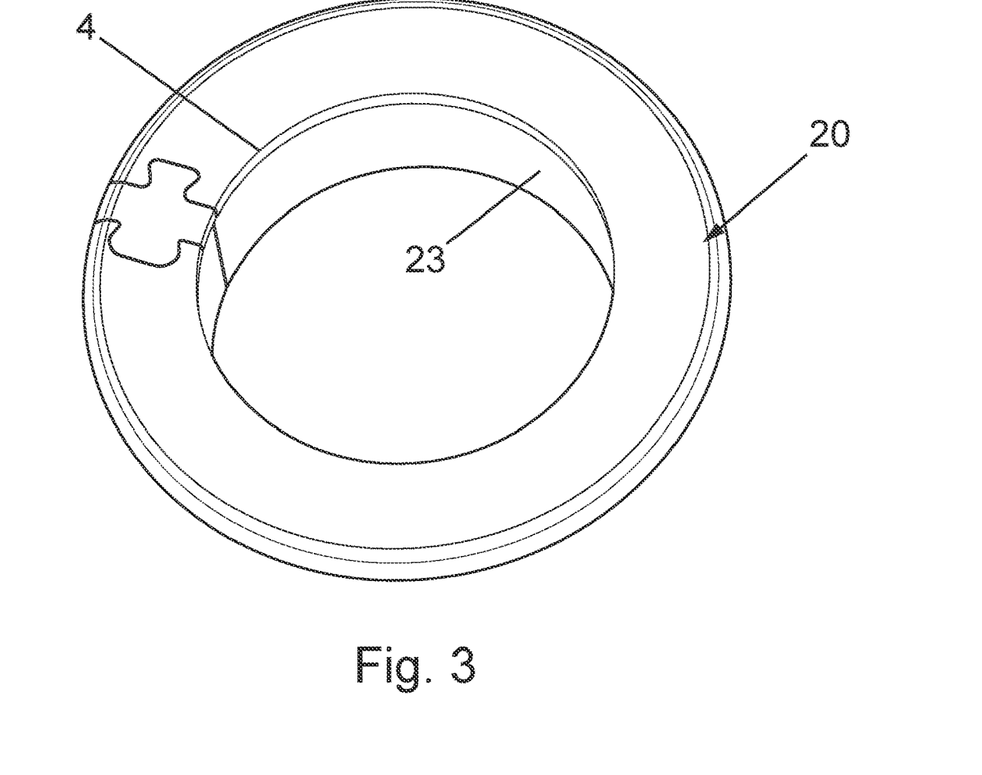
FIG. 3 is a perspective view of the pipe surrounding member from the other side of FIG. 2.

Specifically, the pipe surrounding member comprises a rigid plastics ring 1, having an interior aperture or hole 21, with a substantially perpendicular rubber collar or flange 2 extending from a lower side 3 of the ring 1, from the rim 4 surrounding the aperture (see FIG. 2).

The ring 1 and flange 2 are split/incomplete as shown at the region 20 indicated in FIG. 1. More specifically, the ring 1 is incomplete, with a gap that in this case is butterfly or bow-tie shapes, whereas the flange 2 is split by a straight perpendicular cut. A butterfly or bow-tie-shaped insert 5 is provided to selectively clip the free ends of the incomplete ring 1 together, effectively completing the ring. To this end, the free end surfaces of the ring 1 at the region 20 are formed with complimentary shaped recesses 6 to receive the corresponding part of the insert 5.

Various other clips or mechanisms for completing or connecting the surrounding member can be provided. In this way, it is possible for the surrounding member to be located around existing pipework, in-situ, and then clipped together. This is performed by first unclipping the ring 1 by removing or opening the insert 5, then separating or deforming the free ends of the ring and flange 2, locating both around the pipework, and then replacing or closing the insert 5 in the gap to retain the shape.

Once located around pipework at the desired location, the surrounding member acts to seal the gap where a pipe enters or exits a wall. To this end, the flange 2 part of the member can extend into the wall aperture entrance such that the outer surface 7 of the flange 2 abuts the internal surface of the bore. The internal surface 8 of the flange 2 extends around the pipework.

All or part of the flange section 2 may be separable from the ring section 1 to cater for unusually dimensioned pipework. Separation may be possible through the provision of a line of weakness along a section of the flange 2 or at the junction between the flange 2 and the rim 4 of the ring section 1. The line of weakness may be provided by means of a narrower wall section, for example.

In such circumstances the user has the option of tearing or otherwise separating the flange 2 or a part thereof along the line of weakness, and/or using adhesive or other means to adhere the ring section 1 around the aperture opening.

Figure 4:
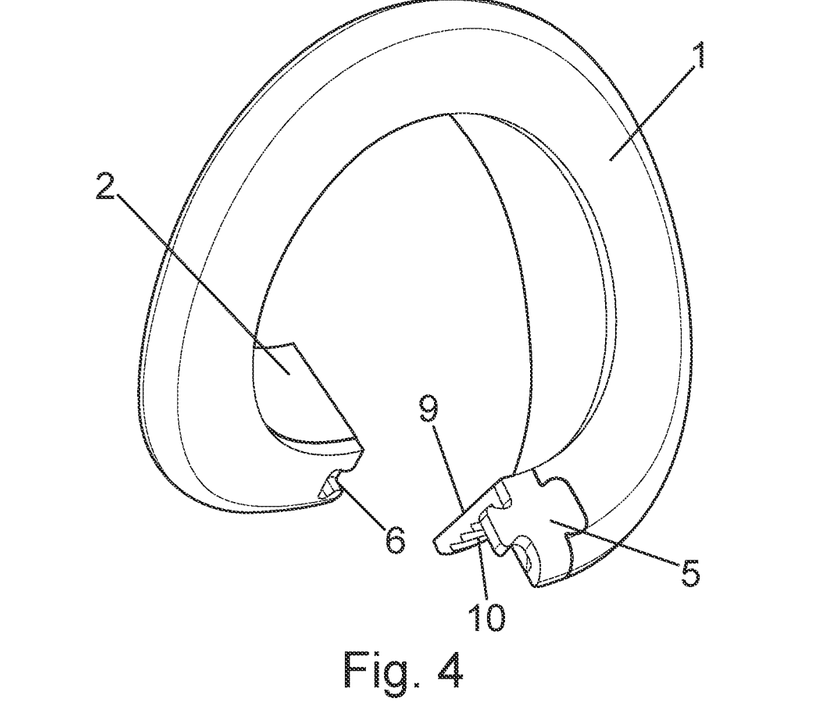
FIG. 4 is a perspective view of the pipe surrounding arrangement in a separated configuration.

The pipe surrounding member in its split configuration is shown in FIG. 4. As previously explained, the split is to allow the pipe surrounding member to be placed around the pipework in situ. The split extends through the flange section 2 as well as the ring section 1. As can be seen in FIG. 4, the insert 5 is used to complete, and join the ring section 1 together. The cut in the flange section is straight and extends perpendicular to the cut in the ring section 1, from one side of the insert 5.

Figure 5:
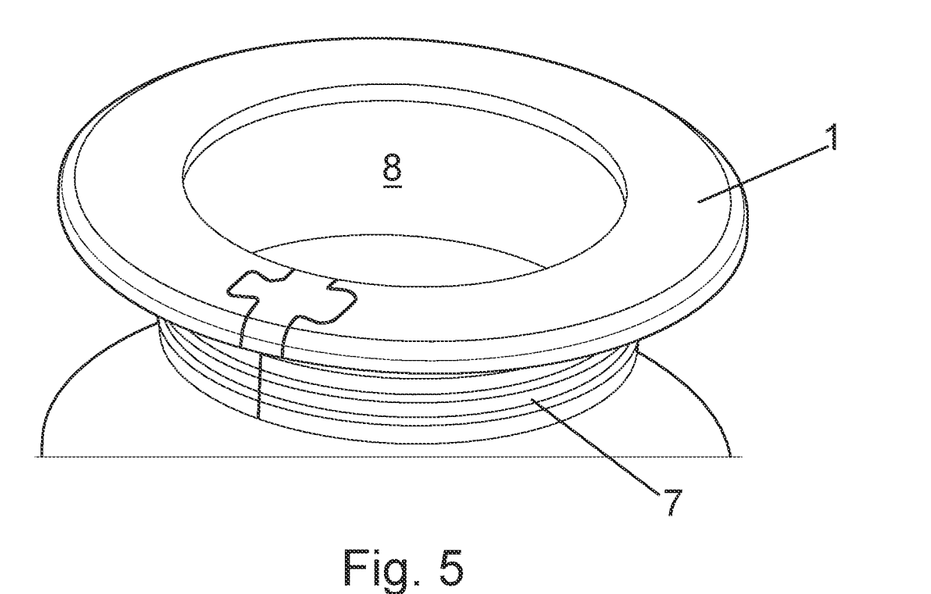
FIG. 5 is a perspective view of a further embodiment of a pipe surrounding member constructed in accordance with the invention.

The embodiment of FIG. 5 is the same as that of FIG. 1 except that the flange 2 is wider to provide more support to the seal by increasing the surface area engaging the wall.

Foam may be provided on the rear side, possibly extending into the inner edge of the ring section 1 and/or flange section 2, with an adhesive layer to permit the seal to be attached to a wall to provide a water-tight seal.

Figure 6:
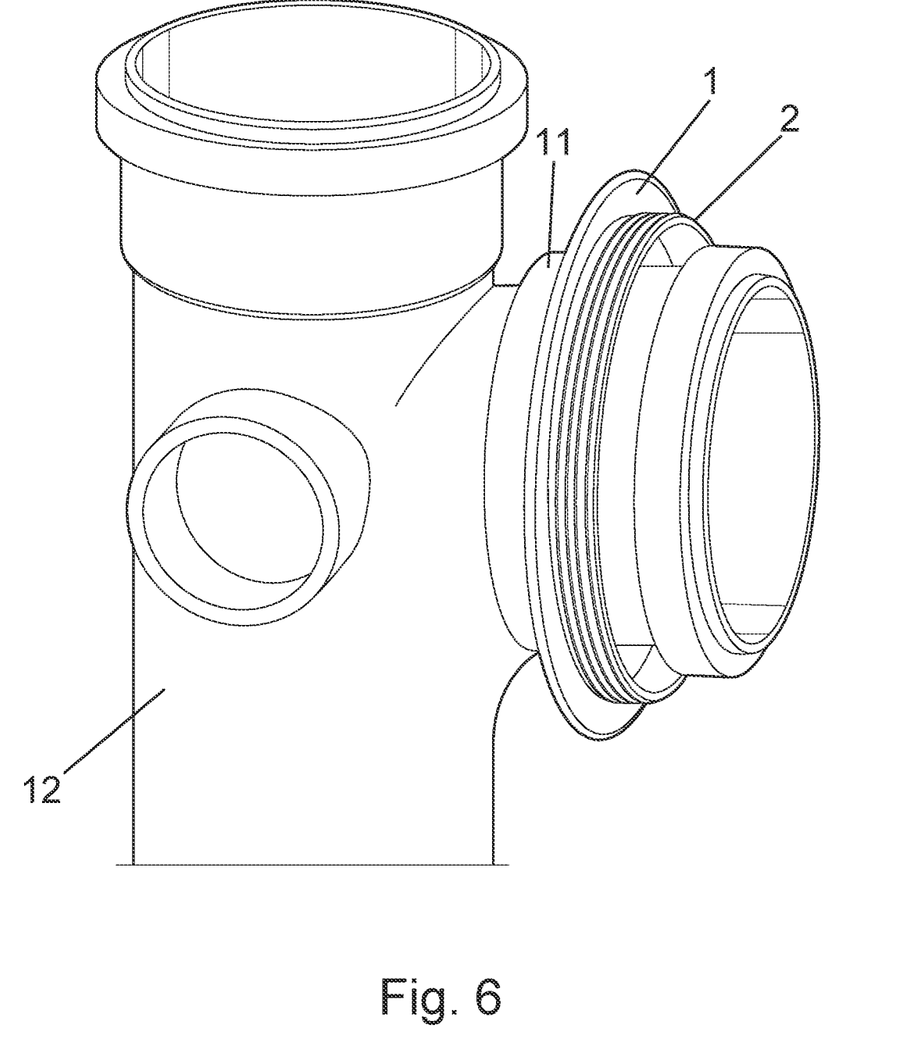
FIG. 6 is a perspective view of a further embodiment of a pipe surrounding member in use on a pipe.

FIG. 6 shows a further embodiment, in which a second rubber flange 11 or collar is located on the opposite side of the ring section 1 from which the (first) flange section 2 extends. The aim here is to help the seal fit to an angled pipe branch 12 and cater for the numerous ridges and joints in that pipework. The second rubber flange 11 or collar is split to allow in-situ attachment.

Figure 7:
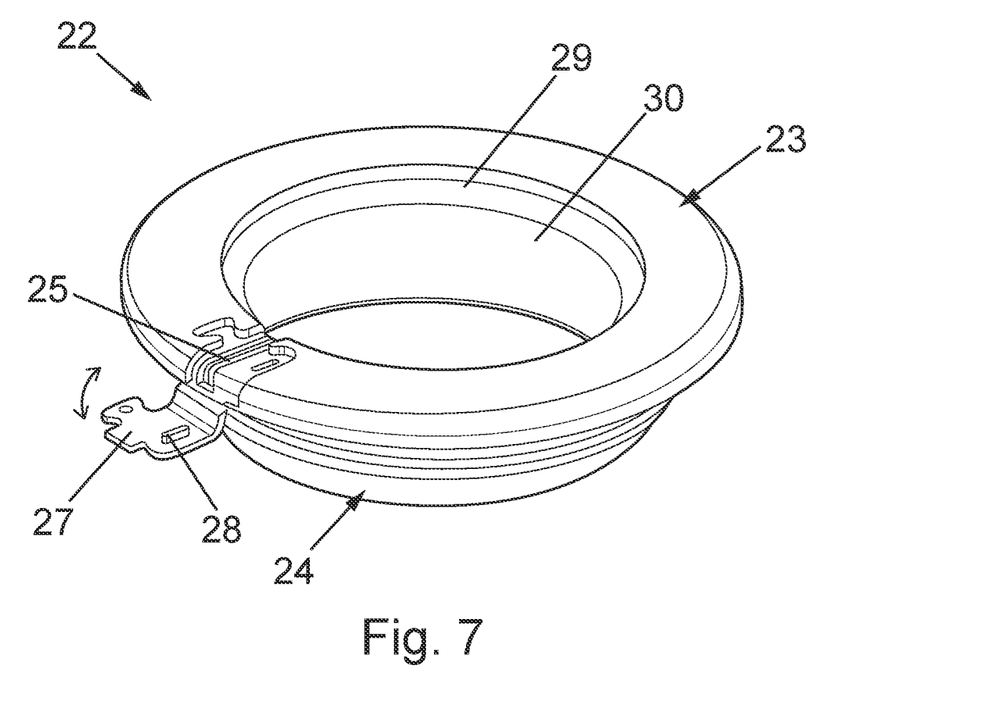
FIG. 7 is an upper perspective view of a pipe surrounding member according to a further embodiment of the invention.
Figure 8A:
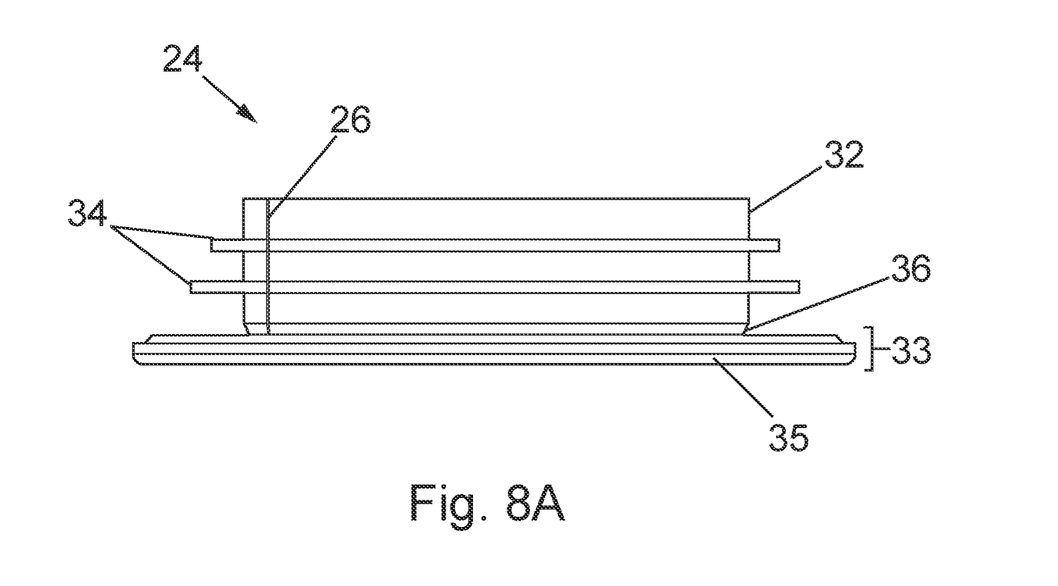
FIGS. 8(a) and (b) are side views of part of the FIG. 7 member.
Figure 8B:
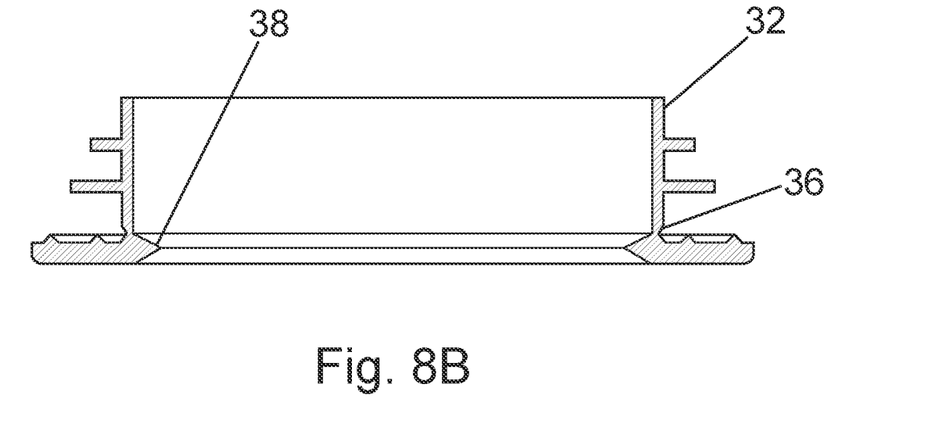
Figure 9:
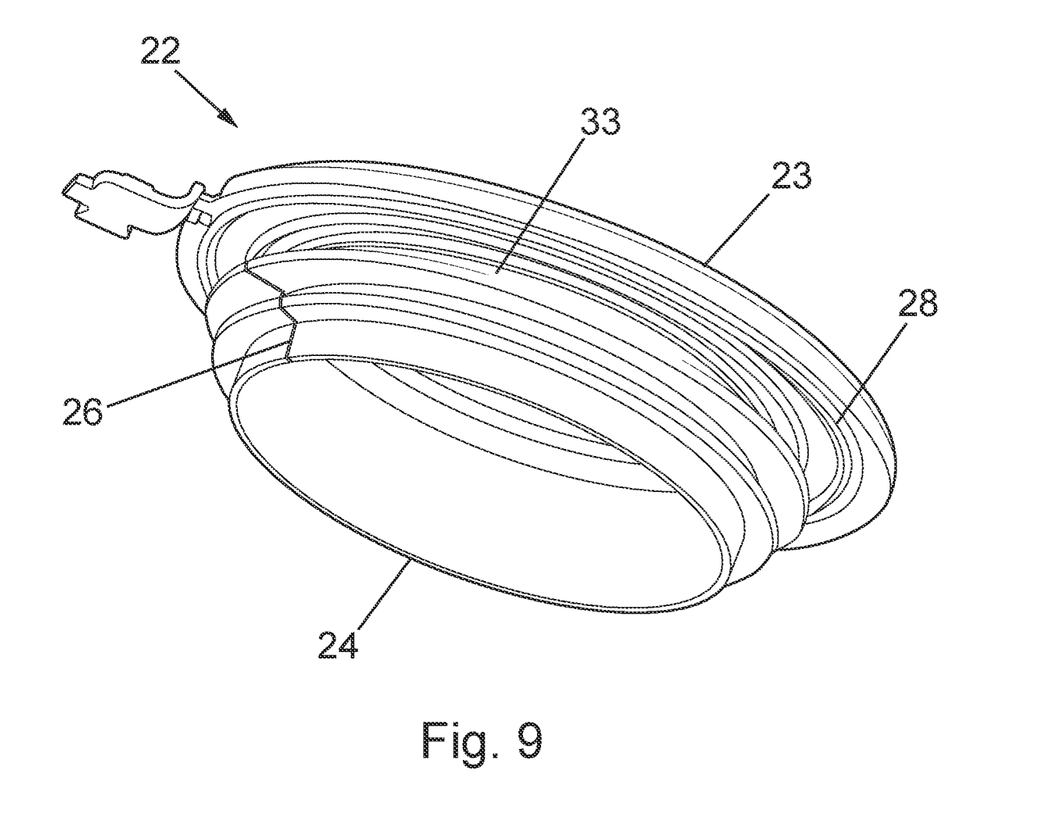
FIG. 9 is a lower perspective view of the FIG. 7 member.

A further embodiment is shown in FIGS. 7 to 9. The pipe surrounding member 22 is similar to that shown in FIGS. 1 to 6. It comprises a relatively rigid plastics ring 23 with an interior aperture. A rubber collar or flange 24 is joined (e.g. adhered) to the inner rim of the ring aperture and projects downwards, substantially perpendicular to the plane of the ring 23. Part of the interior wall 30 of the collar or flange 24 is narrower in diameter than that of the ring 23 to permit a close gripping fit over a pipe. Reference numeral 29 indicates a tapered section of the wall which extends inwardly to the narrower part.

As before, the collar or flange 24 is effectively a pipe with a cut 26 running along its length, transverse to the plane of the ring 23, and in alignment below a gap 25 in the ring to permit the surround member 22 to be opened and placed over an in-situ pipe as previously described.

The ring 23 is incomplete, as before, but in this embodiment an insert 27 is provided which is hingedly attached to one free-end of the ring, on its outer edge as shown in FIG. 7. The insert 27 is not fixed to the opposite free-end. The insert 27 is therefore arranged to pivot as indicated between open and closed positions, i.e.

to permit the ring 23 and collar/flange 24 to be parted for placement, and then to lock or fix the ring 23 to hold the surrounding member 22 in place around the pipe.

The insert 27 is, as before, bow-tie shaped and the lateral U-shaped portions are configured to locate within like-shaped U-shaped recesses which are sunken within the ring upper surface. Further, first and second protrusions 28 are provided on the lower face of the insert 27 for engaging within like-shaped indents, either side of the gap 25, in the sunken part of the ring 23. These provide extra stability and an improved and positive locking mechanism which enables the user to feel and/or hear a clicking engagement. The gap 25 is covered in the closed position and cannot be opened unless the insert 27 is forced upwards by user action.

Referring specifically to FIG. 8(a), the collar or flange 24 is shown from one side. It is formed of a resilient rubber material, as in the previous embodiment(s), and comprises a cylindrical tubular wall 32 upstanding from a ring-like wall 33. The tubular wall 32 comprises a plurality of flanges 34 projecting outwardly therefrom. The cut 26 that underlies the gap 25 of the ring 23 is shown. The flanges 34 permit the surrounding member 22 to be retained within a wall opening, in use.

Referring to FIG. 8(b), part of the ring-like wall 33 has an internal diameter which is less than that of the ring 23. The profile of said wall 33 at the interior edge 38 tapers at this part to a point, or similar, and thereby can grip pipes of different diameters by deformation as such a pipe is inserted.

Referring to FIG. 9, the ring-like wall 33 is in use adhered (or otherwise fixed) to or within the lower wall of the ring 23 using surface 35. Said lower wall may comprise one or more circumferential wall(s) 28 which help adhere the product to a wall exterior, either directly or via an additional adhesive.

Referring back to FIGS. 8(a) and 8(b), the tubular wall 32 has a circumferential line of weakness provided by a section 36 of narrower thickness. This can be cut by tearing, or cutting with a knife or scissors, to detach the wall 32 from the ring 23 where the wall is not required in use.

Figure 10:
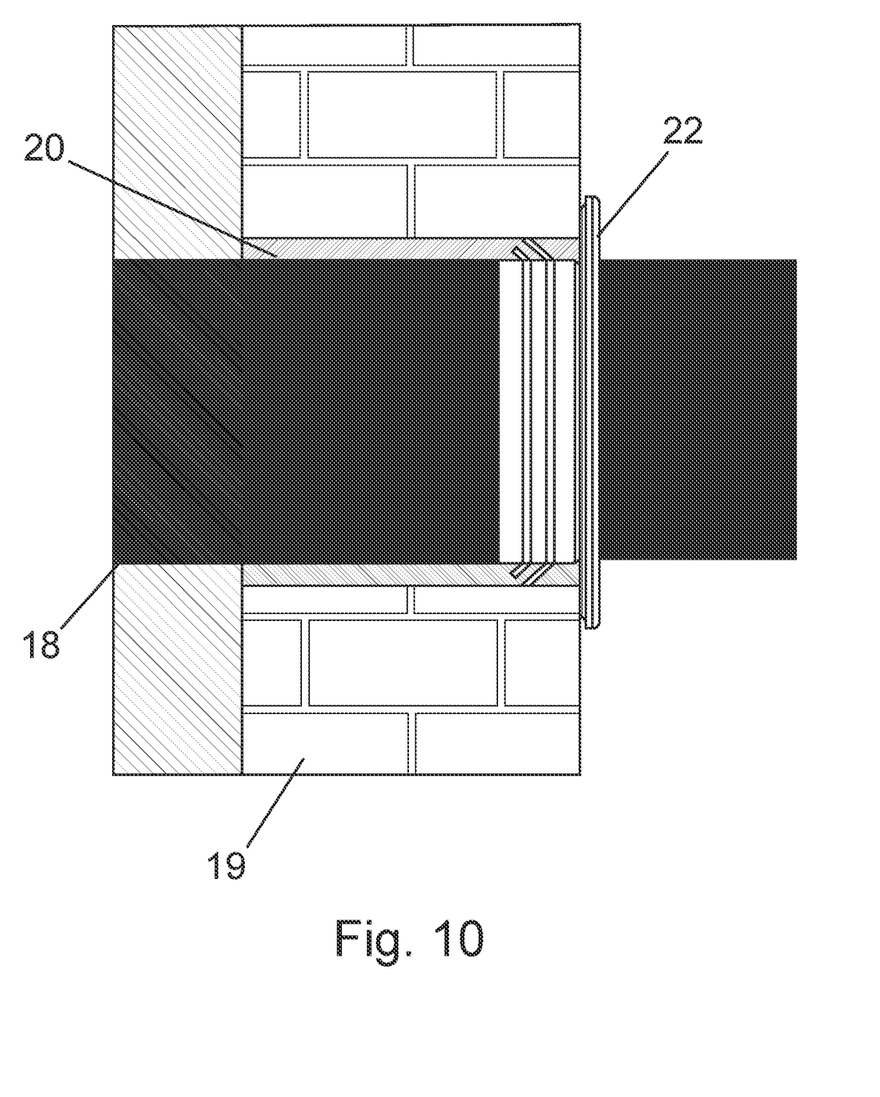
FIG. 10 is a schematic side view of the FIG. 7 member when installed around a pipe passing through a wall.

Referring to FIG. 10, the surrounding member 22 is shown placed around a pipe 18 that extends through a wall 19. The surrounding member 22 is in this case installed on the exterior side. The area indicated 20 is the hole in the wall 19 through which the pipe 18 extends. The ring 23 and the top part of the collar 24 sits on the wall exterior, with a tight fit around the pipe 18 and against the wall 19. The remainder of the collar 24 is inside the hole 20, i.e. within the wall 19. The flanges 34 bend to accommodate the gap between the pipe 18 and the surrounding hole 20, thereby holding the surrounding member 22 in place and providing an air and water-tight seal.

FIGS. 11 to 14 illustrate a further embodiment of a pipe surrounding member. Here, the surrounding member comprises a conical ring 13 consisting of a first circular end 14 of a first diameter and second circular end 15 of a second, larger diameter with a tapered surface 16 extending therebetween. The ring 13 is made from a plastics material. It is envisaged that the ring 13 could be made of any suitable, non-degradable material.

Figure 11:
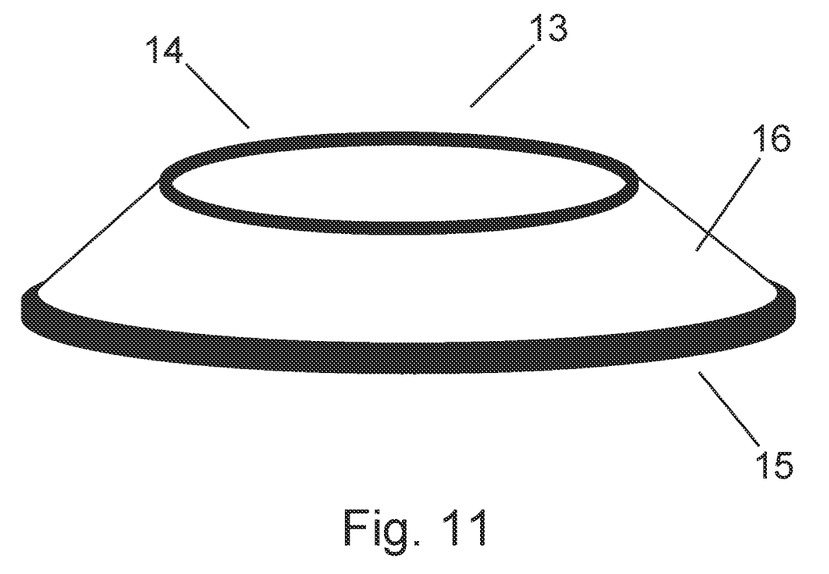
FIG. 11 is a schematic view of a further embodiment pipe surrounding member constructed in accordance with the invention.
Figure 12:
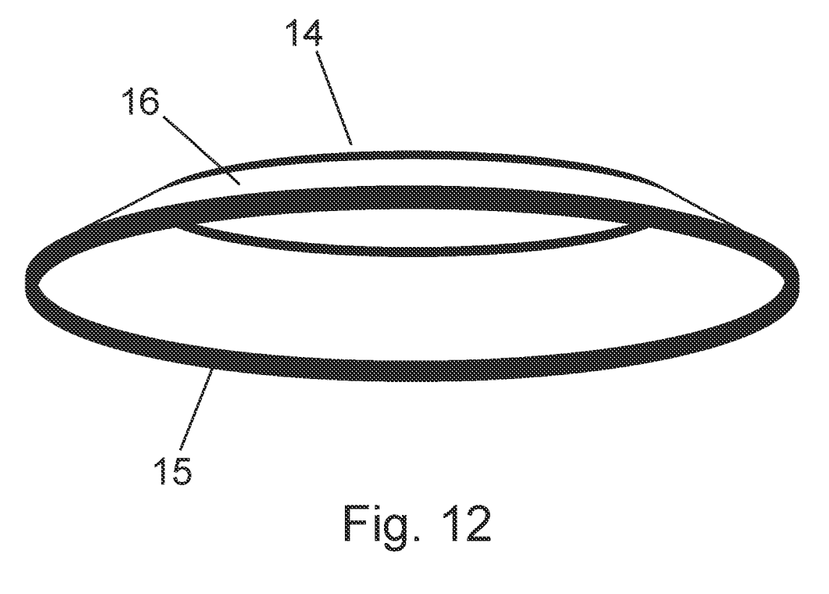
FIG. 12 is a view taken from below of the surrounding member of FIG. 11.

The rims of first and second ends are lined with a layer of adhesive foam 17.

The ring 13 is, in use, designed to be placed around a pipe 18 at the point at which the pipe extends into a wall 19 (see FIG. 9).

Figure 13:
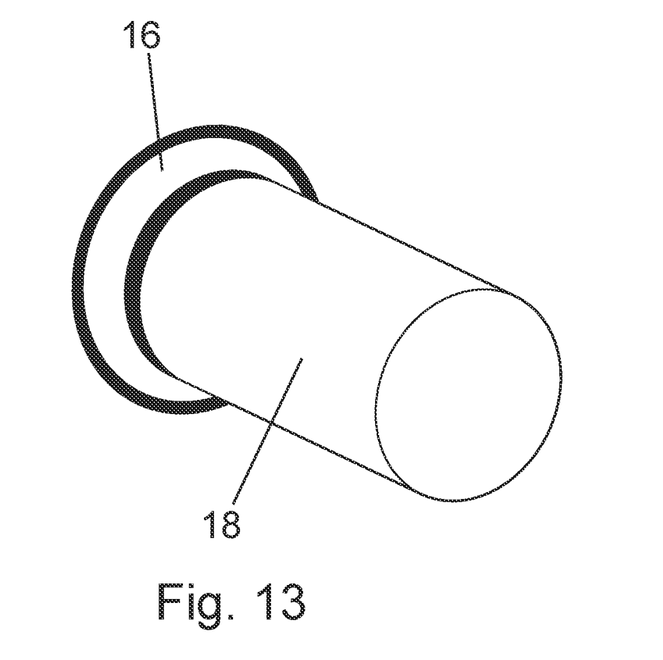
FIG. 13 illustrates the FIG. 11 surrounding member in place over a pipe.
Figure 14:
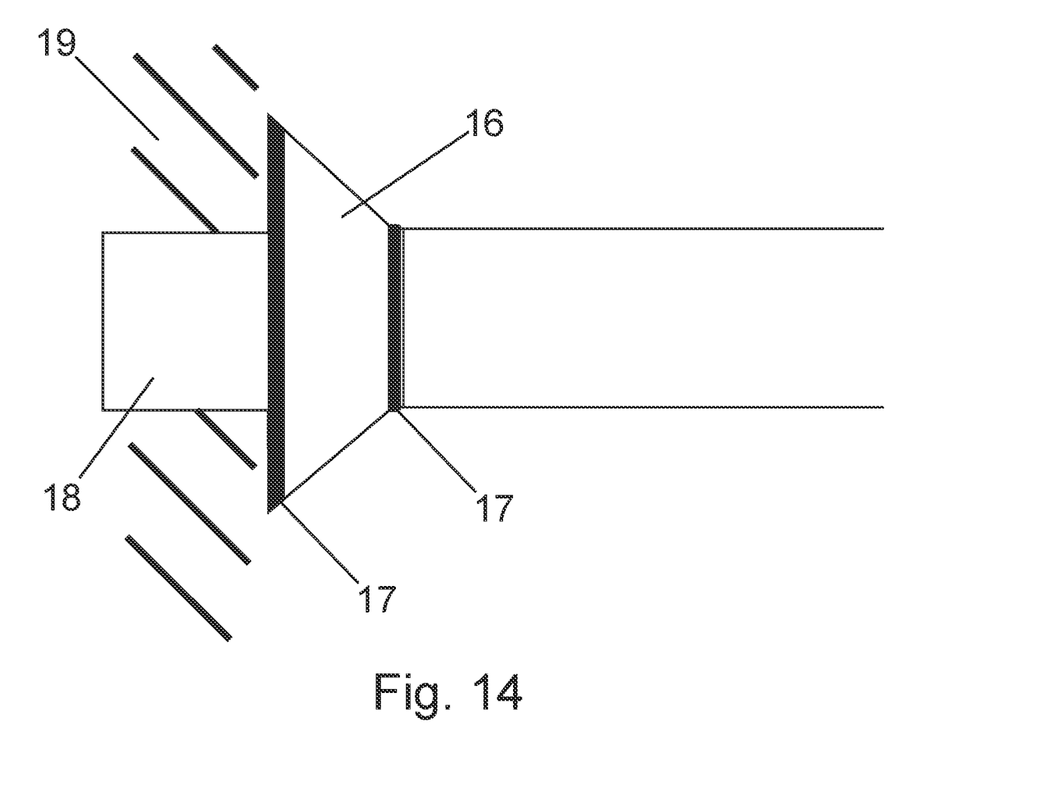
FIG. 14 is a schematic illustration showing the FIG. 11 surrounding member in use.

As shown best in FIG. 13, the foam layer 17 located along the rim of the first end 14 provides a fully air tight and water tight seal between the ring 13 and the pipe 18 it surrounds.

Moreover, the foam layer 17 on along the rim of the second end 15 provides a fully air tight and water tight seal in the area at which the pipe 18 extends into the wall 19, thereby conforming to strict construction regulations improving the energy efficiency of buildings.

Furthermore, the foam layer 17 is compressed between the end 15 of the ring 13 and the wall 19, expanding into any gaps thereby providing an air-tight, water-tight seal even when the wall is uneven, for example on outside exposed brickwork or when the pipe 18 extends into angled walls or skirting boards.

The foam chosen for the foam layers 17 is able to withstand a wide range of temperatures allowing the ring 13 to be applicable to internal and external conditions without degradation.

With external use, the use of the ring 13 removes the need for pointing or applying mortar which currently needs to be carried out to seal the gap between the pipe 18 and the wall 19. The pipe 18 is easily fitted by plumbers in a single use, often while on a ladder, resulting in additional health and safety benefits. Furthermore, the removal of the need for pointing or applying mortar means that the service of a bricklayer is not required, thereby reducing the overall time and cost associated with the work.

The top surface of the foam has an adhesive layer which is initially covered by a removable liner. At the point of use, the liner is removed (simply peeled off) exposing the adhesive layer which is then pushed onto the wall 19 and pipe 18 to stick the foam layers 17 and hence the ring 13 in place.

The diameter of the first end 14 may be adjustable to fit varying sizes of pipes.

In all above embodiments, the use of the surrounding member removes the need for pointing or applying mortar which currently needs to be carried out to seal the gap between the pipe and the wall. The pipe is easily fitted by plumbers in a single use, often while on a ladder, resulting in additional health and safety benefits. It is quick and straightforward to use. Furthermore, the removal of the need for pointing or applying mortar means that the service of a bricklayer is not required, thereby reducing the overall time and cost associated with the work. As well as providing an aesthetically pleasing finish, in some embodiments the surrounding member provides a fluid-tight seal against the ingress of water, moisture and/or contaminants.

As well as being useful for surrounding pipes, the surrounding members described are also applicable to cables and the like, and references to the word pipe or pipes should be intepreted also to mean cables.

It will be appreciated that the foregoing are merely examples of embodiments of a pipe surrounding system and just some examples of its use. The skilled reader will readily understand that modifications can be made thereto without departing from the true scope of the invention.

The invention claimed is:

1. A surrounding member for a pipe, the surrounding member comprising a radially extending ring and a tubular collar or flange part extending axially from one side of the ring and having a plurality of flanges projecting outwardly, the surrounding member preassembled prior to wall insertion and arranged to fit, in use, around a pipe at or near a location where the pipe extends into a wall, wherein the ring is made from a substantially rigid first material and the tubular collar or flange part is made from a substantially flexible second material; wherein part of the tubular collar or flange part has an internal diameter that is less than the internal diameter of the ring; and wherein the ring has an outer diameter that is greater than the outer diameter of the collar or flange part.

2. A surrounding member according to claim 1, wherein the ring is made from a plastics material.

3. A surrounding member according to claim 1, wherein the flange part is made from a rubber.

4. A surrounding member according to claim 1, wherein the flange part has a cut or gap to permit the member to be located around a pipe in-situ.

5. A surrounding member according to claim 1, wherein the ring comprises a gap with the edges of the ring part either side of the gap being connected or covered by an insert.

6. A surrounding member according to claim 5, wherein the insert is generally butterfly shaped.

7. A surrounding member according to claim 5, wherein the insert clip is generally bow-tie shaped.

8. A surrounding member according to claim 5, wherein the insert is pivotably attached to one edge of the ring and is movable between an open and a closed position.

9. A surrounding member according to claim 5, wherein the underside of the insert is arranged to make a positive locking connection with an upper surface of the ring, producing an audible click upon positive locking.

10. A surrounding member according to claim 1, wherein at least part of the flange part is separable from the ring.

11. A surrounding member according to claim 1, further comprising a second collar or flange part for placement on the opposite side of the ring to that of the first collar or flange part.

12. A surrounding member for a pipe, comprising: an incomplete substantially rigid ring having a gap, and, axially projecting from one side of the ring part, generally perpendicular thereto, a resilient collar part with a split generally aligned with said gap to permit both the ring and the resilient collar part to be opened for placement around a pipe, the resilient collar part having a plurality of flanges projecting outwardly therefrom, the ring having a clip or clamping part pivotably attached to one side of the gap which is selectively movable to close or cover the gap wherein the ring has an outer diameter that is greater than the outer diameter of the resilient collar part.

13. A surrounding member according to claim 12, wherein the collar part is formed with a narrow wall section providing a line of weakness permitting tearing or cutting of the collar part from the ring part.

14. A surrounding member according to claim 12, wherein the collar part comprises one or more flanges projecting outwards therefrom.

15. A surrounding member according to claim 12, wherein the collar part comprises a separately formed plastics component comprising a ring portion which is fixed or adhered to the ring part and a perpendicular tubular wall.

16. A surrounding member according to claim 15, wherein part of the interior diameter of the collar's ring portion is less than that of the ring part to which it is attached.

* * * * *